United States Patent
Li et al.

(10) Patent No.: US 11,330,035 B2
(45) Date of Patent: May 10, 2022

(54) METHOD AND SERVER FOR HTTP PROTOCOL-BASED DATA REQUEST

(71) Applicant: WANGSU SCIENCE & TECHNOLOGY CO., LTD., Shanghai (CN)

(72) Inventors: Chen Li, Shanghai (CN); Jinpeng Lin, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 281 days.

(21) Appl. No.: 16/500,015

(22) PCT Filed: Oct. 30, 2018

(86) PCT No.: PCT/CN2018/112683
§ 371 (c)(1),
(2) Date: Oct. 1, 2019

(87) PCT Pub. No.: WO2020/056850
PCT Pub. Date: Mar. 26, 2020

(65) Prior Publication Data
US 2021/0337007 A1    Oct. 28, 2021

(30) Foreign Application Priority Data

Sep. 18, 2018    (CN) .......................... 201811085026.5

(51) Int. Cl.
*H04L 29/08*    (2006.01)
*H04L 67/02*    (2022.01)
(Continued)

(52) U.S. Cl.
CPC .............. *H04L 67/02* (2013.01); *H04L 45/24* (2013.01); *H04L 65/80* (2013.01); *H04L 67/2823* (2013.01); *H04L 69/08* (2013.01)

(58) Field of Classification Search
CPC ... H04L 65/4084; H04L 65/604; H04L 65/80; H04L 65/607; H04L 67/02; H04L 69/161;
(Continued)

(56) References Cited

U.S. PATENT DOCUMENTS 7,130,912 B2 * 10/2006 Nishikado ............... H04L 67/42
709/229
9,473,460 B2 * 10/2016 Vasters ................... H04L 69/40
(Continued)

FOREIGN PATENT DOCUMENTS

CN    102271052 A    12/2011
CN    102368768 A    3/2012
(Continued)

OTHER PUBLICATIONS

The China National Intelleectual Property Administration (CNIPA) The China Search Report for 201811085026.5 Dec. 30, 2019 17 Pages.
(Continued)

*Primary Examiner* — Chirag R Patel

(57) ABSTRACT

A method for HTTP protocol-based data request includes: receiving an HTTP request from a downstream connection, associating the HTTP request with an upstream connection, converting the HTTP request into a data frame, transmitting the data frame through the associated upstream connection, collecting response data from the upstream connection, mapping the response data to the associated HTTP request, and returning the response data to the downstream connection where the HTTP request is located.

19 Claims, 4 Drawing Sheets

(51) Int. Cl.
*H04L 67/565* (2022.01)
*H04L 69/08* (2022.01)
*H04L 45/24* (2022.01)
*H04L 65/80* (2022.01)

(58) Field of Classification Search
CPC ....... H04L 69/162; H04L 45/24; H04L 47/93; H04L 47/196
See application file for complete search history.

(56) References Cited

U.S. PATENT DOCUMENTS

| | | | |
|---|---|---|---|
| 10,057,390 B2* | 8/2018 | Perlmutter | H04L 63/168 |
| 10,122,816 B2* | 11/2018 | Zhang | H04L 69/08 |
| 2008/0114882 A1 | 5/2008 | Christenson | |
| 2014/0258461 A1 | 9/2014 | L Heureux et al. | |
| 2016/0055135 A1* | 2/2016 | Lee | G06F 40/143 |
| | | | 715/234 |
| 2016/0088059 A1 | 3/2016 | Belshe et al. | |
| 2017/0302549 A1* | 10/2017 | Han | H04W 28/08 |
| 2018/0212883 A1* | 7/2018 | Wei | H04L 69/161 |
| 2018/0262419 A1* | 9/2018 | Ludin | H04L 61/1511 |

FOREIGN PATENT DOCUMENTS

| | | |
|---|---|---|
| CN | 103081382 A | 5/2013 |
| CN | 103220278 A | 7/2013 |
| CN | 104113564 A | 10/2014 |
| CN | 104253821 A | 12/2014 |
| CN | 104283957 A | 1/2015 |
| CN | 104396263 A | 3/2015 |
| CN | 104468594 A | 3/2015 |
| CN | 105763507 A | 7/2016 |
| CN | 106027641 A | 10/2016 |
| CN | 107911415 A | 4/2018 |
| JP | 2004013246 A | 1/2004 |

OTHER PUBLICATIONS

The China National Intelleectual Property Administration (CNIPA) The China Search Report for 201811085026.5 Aug. 28, 2020 15 Pages.
The World Intellectual Property Organization (WIPO) International Search Report and Written Opinion for PCT/CN2018/112683 May 24, 2019 9 pages.

* cited by examiner

METHOD AND SERVER FOR HTTP PROTOCOL-BASED DATA REQUEST

CROSS-REFERENCES TO RELATED APPLICATIONS

This application is a national phase entry under 35 U.S.C § 371 of International Application No. PCT/CN2018/112683 filed on Oct. 30, 2018, which claims priority of Chinese Patent Application 201811085026.5, filed with the State Intellectual Property Office of P. R. China on Sep. 18, 2018, the entire contents of all of which are incorporated herein by reference.

FIELD OF DISCLOSURE

The present disclosure generally relates to the field of network transmission and, more particularly, relates to a method and server for HTTP protocol-based data request.

BACKGROUND

The HyperText Transfer Protocol (HTTP) is the most widely used network protocol on the Internet. All WWW files must comply with this standard protocol. The original purpose of designing the HTTP was to provide a way to publish and receive HTML pages.

HTTP is a request/response standard (TCP) between a client terminal and a server. The client terminal is an end user, and the server is a website. Usually, an HTTP client terminal transmits a request and establishes a TCP connection with a port (port 80 by default) designated by the server. The HTTP server listens to the request transmitted by the client terminal at the designated port. Once the request is received, the server returns back to the client terminal a status line, such as "HTTP/1.1 200 OK," and a response message. The message body of the response message may be the requested file, an error message, or some other information.

The existing HTTP (1.0/1.1) protocol is a network protocol based on a request/response model. It is the most widely used network protocol on the Internet. Initially, when the HTTP protocol is used on the TCP protocol, each time when an HTTP request is transmitted, a TCP connection needs to be established and is closed after the response is received. Using this method, a TCP connection needs to be established for each request when a plurality of HTTP requests are processed. However, the frequent establishment of TCP connections causes a large amount of resources to be consumed on the establishment of TCP connections, resulting in low connection usage. In order to improve the connection usage, a method of connection multiplexing has been designed. That is, after the response is received, the connection is not closed. Instead, a subsequent HTTP request is transmitted through this connection, thereby avoiding the establishment of a new connection.

The applicants have found that the existing technologies have at least the following problems: although the connection multiplexing may improve the connection usage to a certain extent, it still has considerable limitations. Only until a response for an HTTP request is received, the connection may not be used for transmitting other HTTP requests. This means that, after the request is transmitted and before the response is received, this connection cannot be used to transmit data even if the connection is still idle.

BRIEF SUMMARY OF THE DISCLOSURE

The objective of the embodiments of the present disclosure is to provide a method and server for HTTP protocol-based data request. When a request is transmitted, without waiting for a response to the transmitted request, the technology disclosed herein allows a subsequent request to be transmitted immediately, thereby reducing the waiting time between a transmitted request and its response and improving the data transmission efficiency.

To solve the above problem, the embodiments of the present disclosure provide a method for HTTP protocol-based data request, which includes: receiving a HTTP request from a downstream connection; associating the HTTP request with an upstream connection; converting the HTTP request into a data frame; and transmitting the data frame through the associated upstream connection.

The embodiments of the present disclosure further provide a server, which includes at least one processor; and a memory communicatively coupled to the at least one processor, where the memory stores instructions executable by the at least one processor, and the instructions, when executed by the at least one processor, cause the at least one processor to implement the above-described method for HTTP protocol-based data request.

The embodiments of the present disclosure further provide a computer-readable storage medium, which stores a computer program that, when executed by a processor, implements the above-described method for HTTP protocol-based data request.

Compared with the existing technologies, the main difference and achievement of the embodiments of the present disclosure lie in that: associate an HTTP request with an upstream connection, and transmit the data frame through the associated upstream connection. In this way, a plurality of HTTP requests may be associated with a same upstream connection. By using a same upstream connection to transmit a plurality of HTTP requests, the number of established connections is reduced and the usage of an established connection is increased. At the same time, by encapsulating the HTTP request into a data frame, a same upstream connection may simultaneously transmit a plurality of data frames, thereby achieving the multiplexing. That is, when a request is being transmitted, without waiting for a response for the transmitted request, a subsequent request may be transmitted immediately, thereby reducing the waiting time between the request and the response and improving the data transmission efficiency.

As a further improvement, associating the HTTP request with the upstream connection superficially includes: determining whether there is an upstream connection that meets the requirements; if there is an upstream connection that meets the requirements, associating the HTTP request with the upstream connection that meets the requirements; if there is no upstream connection that meets the requirements, establishing a new upstream connection, and associating the HTTP request with the new upstream connection. When there is no upstream connection that meets the requirements, a new connection is then established, which ensures that the request is associated with an appropriate upstream connection.

As a further improvement, determining whether there is an upstream connection that meets the requirements specifically includes: determining whether there is an upstream connection that meets the requirements based on one of the following or any combination thereof: the destination of the HTTP request, the amount of data being transmitted through the upstream connection, and the data transmission protocol. By associating the upstream connection according to various conditions of the HTTP request, it allows the HTTP request to be associated with an appropriate upstream connection, thereby facilitating accurate and efficient transmission of each type of request.

As a further improvement, HTTP requests correspond to a plurality of types, and each type of HTTP request corresponds to an identifier. And converting the HTTP request into a data frame specifically includes: searching for a corresponding identifier according to the type of the HTTP request, and using the identifier to replace a character string representing the type of the HTTP request in the data frame. In the disclosed embodiment, a predefined identifier may be used in the data frame to replace the character string of the request type, which greatly shortens the data frame length.

As a further improvement, the response data from the upstream is frame format data. By using the frame format data to respond to the request, it is convenient to carry the information for confirming the request for the response, which may map the response and the request more conveniently.

As a further improvement, after transmitting the data frame through the associated upstream connection, the method further includes: collecting response data from the upstream, mapping the response data to the associated HTTP request; and returning the response data to the downstream connection where the HTTP request is located. The disclosed embodiment allows the response to be accurately mapped to the request.

As a further improvement, returning the response data to the downstream connection where the HTTP request is located specifically includes: processing the response data as a response header and a response body of the response data, respectively; and returning the response header and the response body to the downstream connection where the HTTP request is located. In the disclosed embodiment, the response data is respectively constructed into a response header and a response body, and then transmitted, so that the transmission is accurate and conforms to the protocol requirements.

As a further improvement, returning the response header and the response body to the downstream connection where the HTTP request is located specifically includes: returning the response body after the return of the response header is completed. This ensures that the response body is accurately identified.

As a further improvement, after the HTTP request is associated with the upstream connection, the method further includes: canceling the association between the HTTP request and the associated upstream connection when the upstream connection is abnormal. The association between the request and the connection is canceled when the upstream connection is abnormal, which facilitates updating the association and thus ensures that the request is correctly transmitted.

As a further improvement, determining that the upstream connection is abnormal when the following conditions are met: the data frame fails to be transmitted when the data frame is transmitted through the associated upstream connection; or the acquisition of the HTTP request associated with the response data fails, when the response data is mapped to the associated HTTP request. The disclosed embodiment further refines the situation of the upstream connection abnormality, which facilitates accurate determination of the upstream connection abnormality in real applications.

BRIEF DESCRIPTION OF THE DRAWINGS

One or more embodiments of the present disclosure are exemplified by the accompanying drawings. The exemplary illustrations should not be construed as a limitation to the embodiments of the present disclosure. In the accompanying drawings, like reference numerals refer to like elements. Unless specifically stated, the figures in the accompanying drawings do not constitute a scale limitation.

DETAILED DESCRIPTION

To make the objective, technical solutions, and advantages of the present disclosure clearer, the embodiments of the present disclosure will be made in detail hereinafter with reference to the accompanying drawings. A person skilled in the art may understand that, in order to provide a reader with a better understanding of the present disclosure, numerous technical details are set forth in the various embodiments of the present disclosure. However, even without these technical details and various variations and modifications based on the following embodiments, the technical solutions claimed in the present disclosure may still be implemented.

Embodiment 1 of the present disclosure relates to a method for HTTP protocol-based data request.

In the disclosed embodiment, the main entity for implementing the method for HTTP protocol-based data request may be an intermediate server. The intermediate server may be a server for data transmission in the network. The intermediate server receives a request transmitted from a client terminal and then transmits the request to the backend to receive a backend response. After receiving the backend response, the intermediate server transmits the content of the response in an appropriate format to the client terminal. For example, a CDN node is a very typical intermediate server. The data required for the response of a CDN node is generated by the backend, which may be just cached on the node. A load balancing server is also a very typical intermediate server, which receives a request from a client terminal and distributes the request to a plurality of backend servers. A proxy server is also an intermediate server, which is responsible for forwarding a request to a real backend server. It can be seen that, in real applications, there are many different kinds of intermediate servers, which will not be specifically listed here.

For an intermediate server, there are a frontend and a backend connected to the server. Specifically, the frontend refers to a client terminal, which may be a browser on the client terminal. The connection between a port of the intermediate server and a port of the client terminal is referred to as a downstream connection. The backend refers to a source server. The connection between a port of the intermediate server and a port of the source server is referred to as an upstream connection. Here, the destination of a request may include different source servers. That is, an intermediate server may establish an upstream connection with different source servers. Accordingly, for an intermediate server, a plurality of upstream connections may be established.

Figure 1:
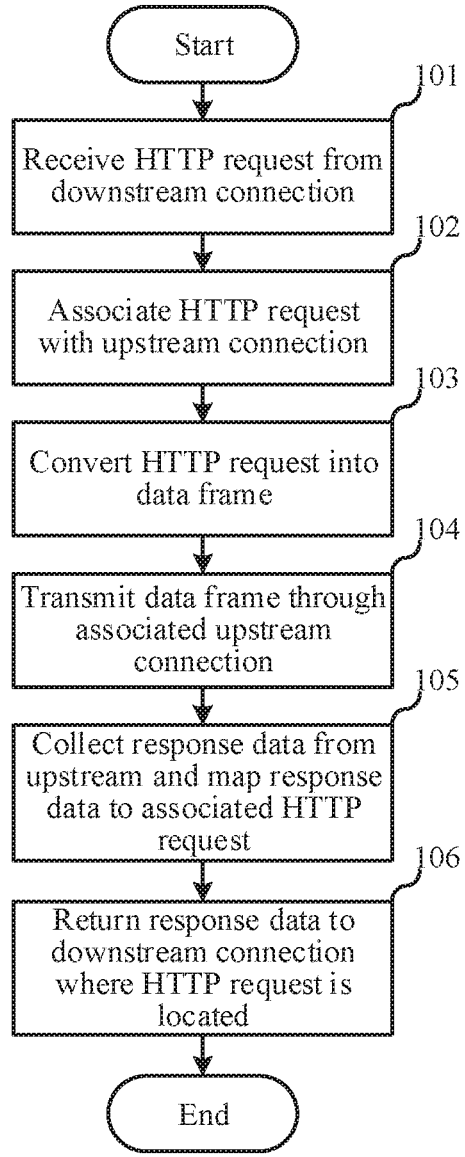
FIG. 1 is a flowchart of a method for HTTP protocol-based data request according to Embodiment 1 of the present disclosure.

FIG. 1 depicts a flowchart of a method for HTTP protocol-based data request consistent with the disclosed embodiment, which is specifically as follows:

Step 101: Receive an HTTP request from a downstream connection.

Specifically, an intermediate server may listen to a request transmitted from a client terminal through a designated port (such as port 80). In one example, after the HTTP request is received, the message of the received HTTP request may be further pre-processed, to prepare for subsequent conversion of the HTTP request into a data frame. Specifically, the request pre-processing includes creating request context for the HTTP request. The created request context may include information for subsequent generation of a data frame, for example, a frame size limitation (e.g., determining that the maximum frame size for a GET request is a first preset value and the maximum frame size for a HEAD request is a second preset value), and request priority level information (e.g., may configure a priority level for the generated data frame based on HEAD information, to allow a backend (i.e., a source server) to preferentially respond to important content based on the priority level). In addition, the created request context usually affects the properties of all frames associated with the request, and these properties do not change with different connections to be associated with the request. The created request context is not limited to the above content and may be set according to actual needs, which is not specified here.

In addition, in real applications, before the request context is created, the header of the HTTP request may be examined, to determine whether the HTTP request can be converted into a specified multiplexing protocol (e.g., it may be specified that only a GET request and a HEAD request are allowed to be converted, while a POST request cannot be converted). Moreover, the timing (e.g., before the request being converted into a data frame) for creating the request context may also vary according to actual conditions, which the present disclosure is not intended to limit.

It should be noted that the process of creating the request context of the HTTP request may be configured as a callback function, such as create_request, which is called through a callback point created in the main program.

Step 102: Associate the HTTP request with an upstream connection.

Specifically, first, query from the established upstream connections whether there is an upstream connection that meets the transmission requirements of the HTTP request, and then associate the HTTP request with an upstream connection that meets the transmission requirements. A connection that has been established between the intermediate server and a backend during the transmission of other HTTP requests may be considered as an established upstream connection. After the other HTTP requests have been transmitted, the upstream connection is not disconnected so that this established upstream connection can be used to transmit a new HTTP request when the new HTTP request is received. This allows a plurality of requests to be transmitted through a single connection. More specifically, the established upstream connections may be connected to different locations. Based on the destination (destination IP and port) of the HTTP request, it may be determined whether an upstream connection meets the requirements. When such an upstream connection that meets the requirements is identified, the HTTP request may be associated with the upstream connection that meets the requirements.

For example, the destination of the received HTTP request is Backend A, and the currently established upstream connections also include an upstream connection that connects to Backend A. This indicates that the established upstream connection that connects to Backend A may be used to transmit the HTTP request, and thus the upstream connection that connects to Backend A is an upstream connection that meets the requirements. Accordingly, the received HTTP request may be associated with the upstream connection that connects to Backend A.

In addition, besides the destination of the HTTP request, the to-be-met requirements may also include an applicable protocol. If a backend supports multiple types of protocol data, the to-be-transmitted data frame may also be frame data applicable to different protocols. The frame data applicable to different protocols may be in different formats. Therefore, when associating an upstream connection, the protocol types applicable to the upstream connection may also be identified, to determine whether there is an upstream connection that has the same applicable protocol as the to-be-transmitted request.

Moreover, the to-be-met requirements may also include an amount of data being transmitted through an upstream connection. If the amount of data being transmitted through an upstream connection has reached an upper limit, the upstream connection does not meet the requirements. It can be seen that the to-be-met requirements may be set by technical staff according to actual needs, which is not specified here.

Step 103: Convert the HTTP request into a data frame.

Specifically, the to-be-transmitted data in the message of the HTTP request may be converted into a data frame that conforms to a multiplexing private protocol. The data frame is then placed into a to-be-transmitted data queue for the associated upstream connection.

For example, the frame information of the data frame is generated based on the status information of the associated upstream connection. The frame information may include at least: an ID and a frame length. The frame content may be the content of the HTTP request.

In some embodiments, HTTP requests may correspond to different types. Each type of HTTP request has a corresponding identifier. Converting the HTTP request into a data frame specifically includes: searching for a corresponding identifier based on the type of the HTTP request, and using the identifier to replace the character string, that represents the type of the HTTP request, in the data frame. That is, the data frame may include an identifier representing the type of the request. The identifier may be predefined. For example, the identifier corresponding to a GET request is "01", and the identifier corresponding to a HEAD request is "02". Since the length of an identifier is much shorter than the length of the character string that represents the type of HTTP request, using the identifier to replace the character string in the data frame that represents the type of HTTP request allows the length of the data frame to be greatly reduced, the transmission amount to be reduced, and the transmission speed to be increased.

It should be noted that the order of the foregoing Steps 102 and 103 is not limited to the above order. In real applications, the data frame may be converted first, and then the upstream connection is associated.

Step 104: Transmit the data frame through the associated upstream connection.

Specifically, the data frame in the to-be-transmitted data queue is transmitted through the associated upstream connection. It should be noted that transmitting a plurality of requests through a single connection is considered as connection multiplexing. In the disclosed embodiment, multiplexing is used to associate an HTTP request with an upstream connection and transmitting a data frame through the associated upstream connection. In this way, a plurality of HTTP requests may be associated with a same upstream connection and a plurality of data frames may be transmitted simultaneously using the same upstream connection. When the upstream connection is used to transmit a data frame, even if the response corresponding to the data frame is not received, a subsequent data frame may still be transmitted. Therefore, without waiting for a response to a previously transmitted request, the same upstream connection may continuously transmit new requests, thereby achieving the multiplexing.

Step 105: Collect response data from the upstream connection, and map the response data to the associated HTTP request.

Specifically, the response data from the upstream connection may be data in the frame format. The specific mapping process may include the search for an HTTP request that is associated with the response data.

Step 106: Return the response data to the downstream connection where the HTTP request is located.

Figure 2:
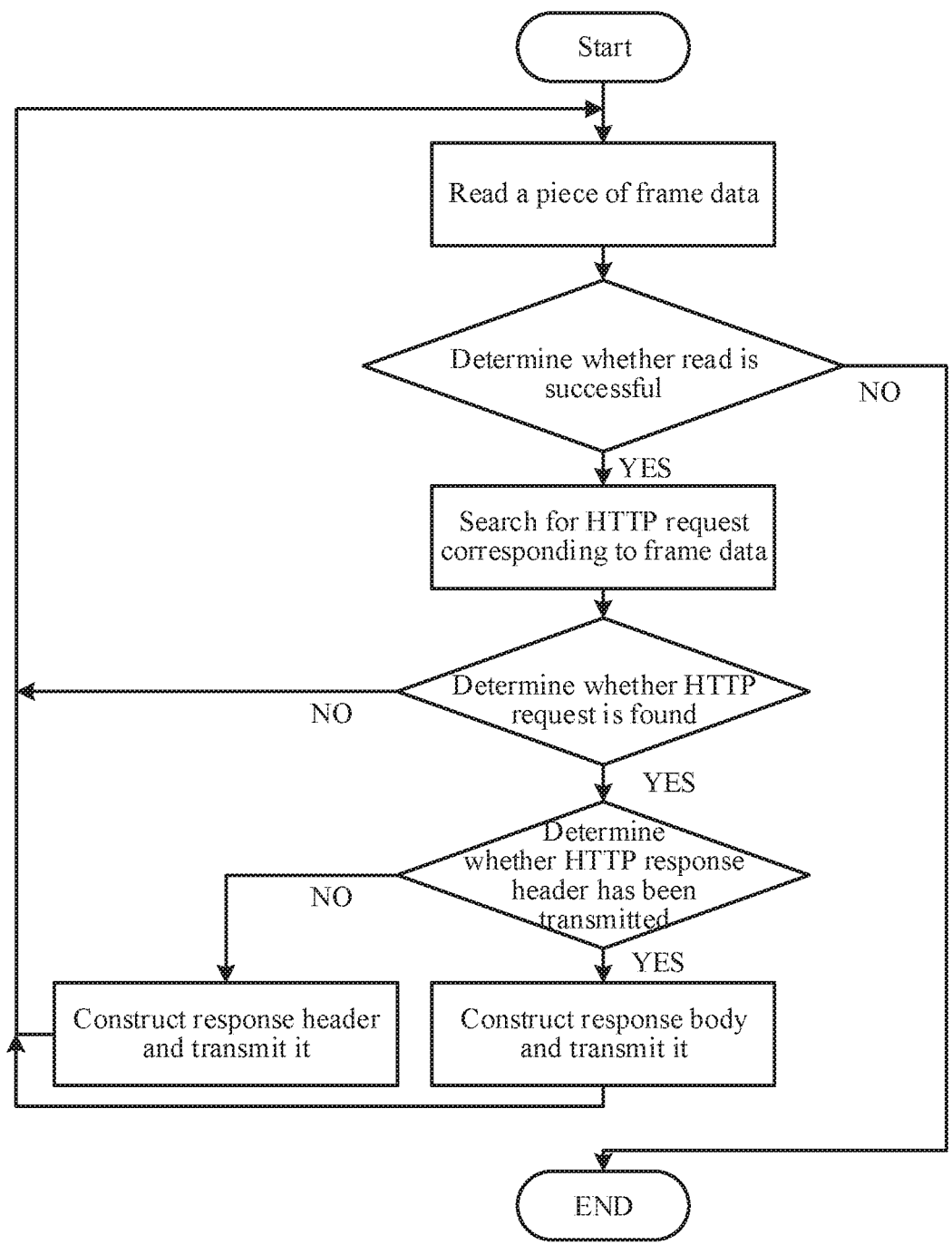
FIG. 2 is a flowchart of a process for implementing Step 105 of the method for HTTP protocol-based data request according to Embodiment 1 of the present disclosure.

In one embodiment, the foregoing Steps 105 and 106 are illustrated in FIG. 2. The received frame format data is read one by one. Then it is determined whether a read is successful. Once a piece of frame data is successfully read, the HTTP request corresponding to the frame data is searched (specifically, based on the identification information of the HTTP requests, the requests that have been transmitted by the associated upstream connection are searched). It is then determined whether the HTTP request is found. If the HTTP request is found, continue to determine whether the HTTP response header has been transmitted. If the HTTP response header has not been transmitted, the data distributed to the HTTP request is processed to form the HTTP response header. After the construction of the HTTP response header is complete, the HTTP response header is transmitted. If the HTTP response header has been transmitted, the data distributed to the HTTP request is processed to form the HTTP response body. The content of the HTTP response body is then transmitted.

The following example is used to illustrate how to search among the requests that have been transmitted by the associated upstream connection based on the identification information of the HTTP requests. After the HTTP requests are transmitted, even if they are transmitted through a same upstream connection, responses from the backend may be out of order. For example, the frontend respectively transmits Request 1, Request 2, and Request 3 through the same connection. When responding to the frontend, the responses provided by the backend may be in the order of Response 1, Response 3, and Response 2. Just based on the response content of the HTTP protocol, it is very difficult to pair a request with a response (i.e., pairing Request 1 to Response 1, pairing Request 2 to Response 2, and paring Request 3 to Response 3), which then leads it very difficult to respond correctly. Therefore, in the embodiments of the present disclosure, the request data is encapsulated into a frame format. That is, an HTTP request is converted into a data frame, and the frame information includes a serial number of the corresponding request. Later, the request may be paired with the response based on the frame information. After the frame information is included, the data transmitted to the backend becomes (frame information 1+request 1) (frame information 2+request 2) (frame information 3+request 3). Even if the responses from the backend are out of order, for example, the response data is transmitted in the order of (frame information 3+response 3) (frame information 2+response 2) (frame information 1+response 1), the request that corresponds to a response may be still found through the frame information, resulting in a correct response.

Further, the response data for the HTTP request is divided into a response header and a response body. Generally, the response header is transmitted to the intermediate server first, and then the response body is transmitted. When converting to the multiplexing protocol, assuming that the response data for a complete request is transmitted to the intermediate server via a plurality of frames, and the first received few frames contain all the data comprising the HTTP response header, then the subsequent frames are just related to the HTTP response body. When the response data is returned to the downstream connection where the HTTP request is located, the response data is specifically processed as the response header and the response body of the response data, which are then distributed. The response body may be distributed after the response header is distributed. Here, the process for processing the data distributed to the downstream connection corresponding to the associated HTTP request into the HTTP response header and the HTTP response body may also be implemented by the intermediate server. Although in the multiplexing protocol, it cannot be differentiated, in the response data transmitted by the backend, which part corresponds to the HTTP response header and which part corresponds to the HTTP response body, it is still assumed that even a part of received response data may be sufficient to construct the response header (in the worst case, the response header is constructed until all the response data corresponding to the request is received. In such a case, the response header and response body are constructed at the same time). Since the received response data may not be sequential, it is also possible that the response to the HTTP request is considered as complete until the response is completely received. In such a case, the response header and the response body are constructed at the same time, which is not limited in the present disclosure.

For example, after the HTTP request is converted into the data frame and transmitted to the specified backend through the associated upstream connection, the backend returns to the intermediate server a total of five frames of response data for the HTTP request:

1. The intermediate server first receives two frames. At this moment, when the process_header is used to process the data in the two frames, it is determined that the received response data is insufficient to construct a complete HTTP response header.

2. The intermediate server receives another frame. When the process_header is used to process the frame, it is determined that a complete HTTP response header can be constructed. The received data is then used to construct the HTTP response header, which is transmitted to the client terminal connected in the downstream.

3. The intermediate server receives one more frame. Since the HTTP response header has been transmitted, the process_body is used to extract the data in the frame. The extracted data is then put in the HTTP response body and transmitted.

4. The intermediate server receives the last frame. Again, the process_body is used to extract the data in the frame, and the extracted data is put in the HTTP response body and transmitted.

The overall process of collecting data from the upstream and distributing the data to the associated HTTP request in the above Step 105 may also be configured as a callback function, such as a dispatch_frame, which is called through a callback point created in the main program. Meanwhile, the process of generating the response header and the process of generating the response body may also be set as a callback function respectively, such as process_header and process_body, which are then called through the callback points created in the main program.

It can be seen that, compared with the existing technologies, the main difference and achievement of the disclosed embodiments lie in that: associate an HTTP request with an upstream connection, and transmit the data frame through the associated upstream connection. In this way, a plurality of HTTP requests may be associated with a same upstream connection. By using a same upstream connection to transmit a plurality of HTTP requests, the number of established connections is reduced and the usage of an established connection is increased. At the same time, by encapsulating the HTTP request into a data frame, a same upstream connection may simultaneously transmit a plurality of data frames, thereby achieving the multiplexing. That is, when a request is being transmitted, without waiting for a response for the transmitted request, a subsequent request may be transmitted immediately, thereby reducing the waiting time between the request and the response and improving data transmission efficiency. In addition, in specific implementations, by using a predefined identifier to replace a character string for representing a request type in a data frame, the frame length is greatly shortened.

Embodiment 2 of the present disclosure relates to a method for HTTP protocol-based data request. Embodiment 2 is a further improvement on the basis of Embodiment 1. The main difference lies in that: in Embodiment 1, when associating the upstream connection, an upstream connection that meets the requirements is associated. In Embodiment 2 of the present disclosure, it may be first determined whether there is an upstream connection that meets the requirements. If there is no upstream connection that meets the requirements, a new upstream connection that meets the requirements may be established, which is then used for association. Embodiment 2 makes the program logic more comprehensive and more in line with real applications.

Figure 3:
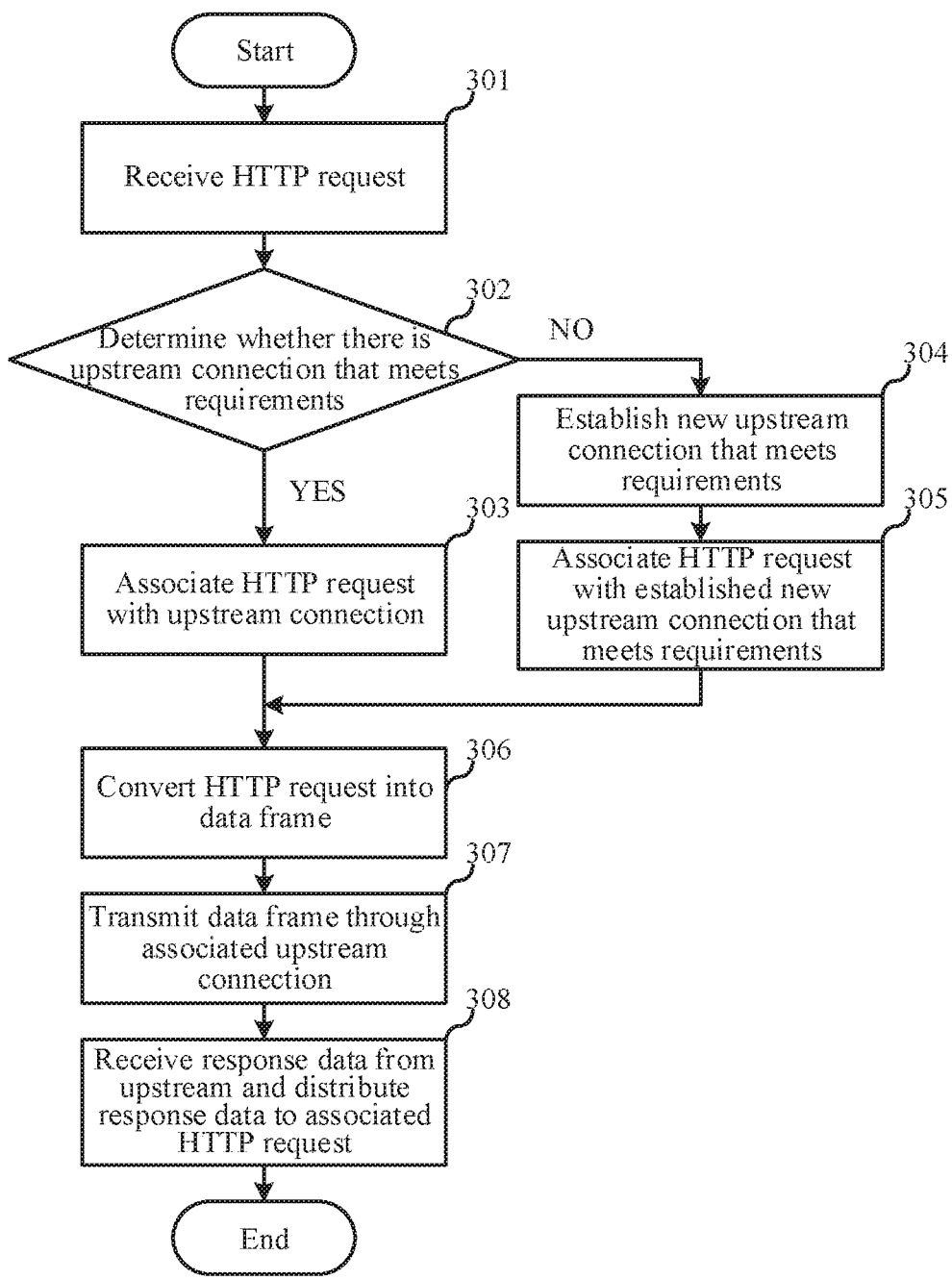
FIG. 3 is a flowchart of a method for HTTP protocol-based data request according to Embodiment 2 of the present disclosure.

FIG. 3 shows a flowchart of a method for HTTP protocol-based data request consistent with the disclosed embodiment, which is specifically as follows:

Step 301 in the present embodiment is similar to Step 101 in Embodiment 1, which will not be described again here.

Step 302: Determine whether there is an upstream connection that meets the requirements. If there is an upstream connection that meets the requirements, proceed to Step 303. If there is no upstream connection that meets the requirements, proceed to Step 304.

Specifically, the to-be-met requirements here are similar to the requirements described in Step 102 of Embodiment 1. Meanwhile, Step 303 in the present embodiment is similar to Step 102 in Embodiment 1, which will not be described again here.

Step 304: Establish a new upstream connection that meets the requirements.

Specifically, when establishing a new upstream connection, certain tasks, such as the connection initialization and protocol parameter configuration, are also performed.

Step 305: Associate the HTTP request with the established new upstream connection that meets the requirements.

Specifically, associating the HTTP request with the established new upstream connection provides a basis for selecting the correct HTTP request among a plurality of HTTP requests when the new upstream connection returns the response data.

It should be noted that Step 304 and Step 305 may also be set as callback functions, such as init_stream and add_request, respectively, which are called through callback points created in the main program.

In addition, Step 306 to Step 308 in the present embodiment are similar to Step 103 to Step 105 in Embodiment 1, which will not be described again here.

It can be seen, in the disclosed embodiment, a new upstream connection is established when there is no upstream connection that meets the requirements. After the new upstream connection is successfully established, the HTTP request is associated with the new upstream connection. This ensures that the HTTP request is associated with an appropriate upstream connection.

Embodiment 3 of the present disclosure relates to a method for HTTP protocol-based data request. Embodiment 3 is a further improvement on the basis of Embodiment 1. The main difference lies in that: in Embodiment 3, an anomaly handling mechanism is added. When the upstream connection is abnormal, the association between the HTTP request and the associated abnormal upstream connection is canceled.

Specifically, in the whole process of the data request, a detection mechanism may be configured in multiple locations to quickly determine whether the upstream connection is abnormal. For example, when the request context fails to create or when there is an error in distributing the upstream response data, an anomaly of the upstream connection may be detected. When an anomaly of the upstream connection is detected, the association between the HTTP request and the associated abnormal upstream connection is canceled, to avoid a situation in which the HTTP request or the HTTP responses cannot be accurately transmitted.

It can be seen that, in the disclosed embodiment, when there is an abnormal connection, the association between the HTTP request and the associated abnormal upstream connection is canceled. This facilitates updating the associated upstream connection to ensure that the request is correctly transmitted.

The steps of the above various methods are divided for the purpose of clear description. In the implementation, the steps may be combined into one step or a certain step may be split and decomposed into a plurality of steps, all of which are within the protection scope of the present disclosure, as long as the same logical relationship is included. The addition of trivial modifications to an algorithm or process, or the introduction of an insignificant design, without changing the core design of the algorithm and process, is still with the scope of the protection of the present disclosure.

Figure 4:
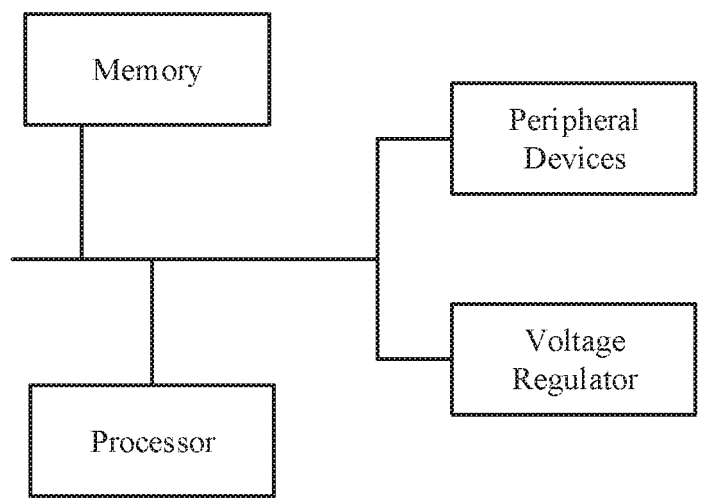
FIG. 4 is a schematic structural diagram of a server according to Embodiment 2 of the present disclosure.

Embodiment 4 of the present disclosure relates to a server. As shown in FIG. 4, the server includes:

at least one processor and a memory communicatively coupled to the at least one processor. The memory stores instructions executable by the at least one processor. The instructions, when executed by the at least one processor, cause the at least one processor to implement any of the methods for HTTP protocol-based data request as described in Embodiment 1 to Embodiment 3.

The memory and the processor are connected via a bus. The bus may include any number of interconnected buses and bridges. The bus connects the various circuits of one or more processors and memories. The bus may also connect various other circuits, such as peripheral devices, voltage regulator, and power management circuits, which are all well known in the art and therefore will not be further described again here. A bus interface provides an interface between the bus and a transceiver. The transceiver may be an element or a plurality of elements, such as a plurality of receivers and transmitters, which provide means for communicating with various other devices on a transmission medium. The data processed by the processor is transmitted over a wireless medium via an antenna. Further, the antenna also receives the data and transmits the data to the processor.

The processor is responsible for managing the bus and general processing, as well as providing various functions including timing, peripheral interfacing, voltage regulating, power management, and other control functions. The memory may be used to store data used by the processor when performing certain operations.

Embodiment 5 of the present disclosure relates to a computer readable storage medium. The computer-readable storage medium stores a computer program that, when executed, implements the above-described method-related embodiments.

A person skilled in the art may understand that all or part of the steps of the foregoing embodiments may take the form of implementation of programs for instructing relevant hardware. The programs may be stored in a storage medium, and include a series of instructions that enable a device (may be a microcontroller, a chip, etc.) or a processor to perform all or part of the steps of each embodiment of the present disclosure. The storage medium includes various media for storing program code, such as a flash drive, a mobile hard drive, a read-only memory (ROM), a random access memory (RAM), a magnetic disk, or an optical disk, and the like.

A person skilled in the art may understand that the foregoing embodiments are merely specific embodiments for implementing the present disclosure. In real applications, various modifications may be made in the form and details of these embodiments without departing from the spirit and principle of the present disclosure.

What is claimed is:

1. A method for HTTP protocol-based data request, comprising:
   receiving an HTTP (Hypertext Transfer Protocol) request from a downstream connection;
   associating the HTTP request with an upstream connection;
   converting the HTTP request into a data frame; and
   transmitting the data frame through the associated upstream connections;
   wherein associating the HTTP request with the upstream connection further comprises:
   determining whether there is an upstream connection that meets requirements;
   if there is an upstream connection that meets the requirements, associating the HTTP request with the upstream connection that meets the requirements; and
   if there is no upstream connection that meets the requirements, establishing a new upstream connection that meets the requirements and associating the HTTP request with the established new upstream connection that meets the requirements.

2. The method according to claim 1, wherein determining whether there is an upstream connection that meets the requirements further includes:
   determining whether there is an upstream connection that meets the requirements based on at least one of a destination of the HTTP request, an amount of data being transmitted through the upstream connection, and a data transmission protocol.

3. The method according to claim 1, wherein:
   HTTP requests correspond to a plurality of types, and each type of HTTP request corresponds to an identifier; and
   converting the HTTP request into a data frame further includes:
   searching for a corresponding identifier based on a type of the HTTP request, and using the corresponding identifier to replace a character string, that represents the type of the HTTP request, in the data frame.

4. The method according to claim 1, wherein response data from the upstream connection is frame format data.

5. The method according to claim 1, wherein, after transmitting the data frame through the associated upstream connection, the method further includes:
   collecting response data from the upstream connection, and mapping the response data to the associated HTTP request; and
   returning the response data to a downstream connection where the HTTP request is located.

6. The method according to claim 5, wherein returning the response data to the downstream connection where the HTTP request is located further includes:
   processing the response data as a response header and a response body of the response data, respectively; and
   returning the response header and the response body to the downstream connection where the HTTP request is located.

7. The method according to claim 6, wherein returning the response header and the response body to the downstream connection where the HTTP request is located further includes:
   returning the response body after the response header is returned.

8. The method according to claim 1, wherein, after associating the HTTP request with the upstream connection, the method further includes:
   canceling the association between the HTTP request and the associated upstream connection when the associated upstream connection is abnormal.

9. The method according to claim 8, further comprising:
   determining that the upstream connection is abnormal if:
   the data frame fails to transmit when transmitting the data frame through the associated upstream connection; or
   acquisition of an HTTP request associated with response data fails when mapping the response data to the associated HTTP request.

10. The method according to claim 8, wherein, after canceling the association between the HTTP request and the associated upstream connection, the method further includes:
    associating the HTTP request with an alternative upstream connection.

11. The method according to claim 1, wherein, before converting the HTTP request into a data frame, the method further includes:
    creating a context for the received HTTP request.

12. The method according to claim 1, wherein converting the HTTP request into a data frame further includes:
    converting to-be-transmitted data in a message of the HTTP request into a data frame that conforms to a multiplexing private protocol, and placing the data frame, that conforms to the multiplexing private protocol, into a to-be-transmitted data queue for the associated upstream connection.

13. The method according to claim 1, further comprising:
    associating a plurality of HTTP requests with the upstream connection; and transmitting a plurality of data frames through the associated upstream connection.

14. A server, comprising:
at least one processor; and,
a memory communicatively coupled to the at least one processor, wherein the memory stores instructions executable by the at least one processor, and the instructions, when executed by the at least one processor, cause the at least one processor to implement a method for HTTP protocol-based data request, the method comprising:
receiving an HTTP request from a downstream connection;
associating the HTTP request with an upstream connection;
converting the HTTP request into a data frame; and
transmitting the data frame through the associated upstream connection;
wherein associating the HTTP request with the upstream connection further comprises:
determining whether there is an upstream connection that meets requirements;
if there is an upstream connection that meets the requirements, associating the HTTP request with the upstream connection that meets the requirements; and
if there is no upstream connection that meets the requirements, establishing a new upstream connection that meets the requirements and associating the HTTP request with the established new upstream connection that meets the requirements.

15. The server according to claim 14, wherein determining whether there is an upstream connection that meets the requirements further includes:
determining whether there is an upstream connection that meets the requirements based on at least one of a destination of the HTTP request, an amount of data being transmitted through the upstream connection, and a data transmission protocol.

16. The server according to claim 14, wherein:
HTTP requests correspond to a plurality of types, and each type of HTTP request corresponds to an identifier; and
converting the HTTP request into a data frame further includes:
searching for a corresponding identifier based on a type of the HTTP request, and using the corresponding identifier to replace a character string, that represents the type of the HTTP request, in the data frame.

17. The server according to claim 14, wherein, after transmitting the data frame through the associated upstream connection, the method further includes:
collecting response data from the upstream connection, and mapping the response data to the associated HTTP request; and
returning the response data to a downstream connection where the HTTP request is located.

18. A non-transitory computer readable storage medium, the computer readable medium storing a computer program that, when executed by a processor, implements a method for HTTP protocol-based data request, the method comprising:
receiving an HTTP request from a downstream connection;
associating the HTTP request with an upstream connection, wherein the upstream connection is selected from established upstream connections, and wherein the established upstream connections are connections that have been established between an intermediate server and a backend during transmission of other HTTP requests, and are not disconnected after the other HTTP requests have been transmitted;
converting the HTTP request into a data frame; and
transmitting the data frame through the associated upstream connection;
wherein associating the HTTP request with the upstream connection further comprises:
determining whether there is an upstream connection that meets requirements;
if there is an upstream connection that meets the requirements, associating the HTTP request with the upstream connection that meets the requirements; and
if there is no upstream connection that meets the requirements, establishing a new upstream connection that meets the requirements and associating the HTTP request with the established new upstream connection that meets the requirements.

19. The non-transitory computer readable storage medium according to claim 18, wherein determining whether there is an upstream connection that meets the requirements further includes:
determining whether there is an upstream connection that meets the requirements based on at least one of a destination of the HTTP request, an amount of data being transmitted through the upstream connection, and a data transmission protocol.

* * * * *